United States Patent
Chen et al.

(10) Patent No.: US 12,555,253 B2
(45) Date of Patent: Feb. 17, 2026

(54) DETERMINISTIC OBJECT ALIGNMENT FOR BACKGROUND REMOVAL

(71) Applicant: Cisco Technology, Inc., San Jose, CA (US)

(72) Inventors: Eric Yi-hua Chen, Irvine, CA (US); Gregory Lee Hewett, Plano, TX (US); Scott Henning, Fairview, TX (US); Shamim Sharifuddin Pirzada, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 420 days.

(21) Appl. No.: 18/102,900

(22) Filed: Jan. 30, 2023

(65) Prior Publication Data

US 2024/0257365 A1 Aug. 1, 2024

(51) Int. Cl.
*G06T 7/33* (2017.01)
*G06T 7/194* (2017.01)
*G06T 7/73* (2017.01)

(52) U.S. Cl.
CPC .............. *G06T 7/337* (2017.01); *G06T 7/194* (2017.01); *G06T 7/73* (2017.01); *G06T 2207/10016* (2013.01); *G06T 2207/20132* (2013.01); *G06T 2207/30196* (2013.01)

(58) Field of Classification Search
CPC ........... G06T 7/337; G06T 7/194; G06T 7/73; G06T 7/33
See application file for complete search history.

(56) References Cited

U.S. PATENT DOCUMENTS

| | | | | |
|---|---|---|---|---|
| 5,914,748 A * | 6/1999 | Parulski | ................. | H04N 5/272 348/241 |
| 8,294,823 B2* | 10/2012 | Ciudad | ................... | H04N 7/147 348/14.08 |
| 9,615,054 B1* | 4/2017 | McNelley | .............. | H04N 7/144 |
| 10,447,945 B2 | 10/2019 | Oetting | | |
| 2004/0032906 A1 | 2/2004 | Lillig | | |
| 2004/0062439 A1* | 4/2004 | Cahill | ........................ | G06T 5/50 382/209 |
| 2005/0225648 A1* | 10/2005 | Lin | ........................... | G06T 7/12 348/222.1 |
| 2008/0303949 A1* | 12/2008 | Ciudad | ................... | H04N 9/74 348/E9.055 |

(Continued)

OTHER PUBLICATIONS

Kortepeter, Derek, "A quick overview of Log4Shell, the most dangerous Java exploit in years", online: https://techgenix.com/a-quick-overview-of-log4shell-the-most-dangerous-java-exploit-in-years/, Dec. 2021, 6 pages, TechGenix.

(Continued)

*Primary Examiner* — Olisa Anwah
(74) *Attorney, Agent, or Firm* — Lee & Hayes, P.C.

(57) ABSTRACT

In one embodiment, a device may obtain a user-free first image of a background portion of a physical environment including a deterministic object. The device may then locate the deterministic object in a second image of the physical environment. The device may then generate, based on the deterministic object, an alignment between the user-free first image and the second image. The device may then use the alignment for background removal in subsequent images of the physical environment.

20 Claims, 11 Drawing Sheets

(56) References Cited

U.S. PATENT DOCUMENTS

2011/0164823 A1     7/2011   Park et al.
2023/0306610 A1*   9/2023   Nicholson ................ G06T 5/50

OTHER PUBLICATIONS

"CVE-2021-44228", online: https://cve.mitre.org/cgi-bin/cvename.cgi?name=CVE-2021-44228, accessed Jan. 30, 2023, 5 pages, The Mitre Corporation.

"CVE-2021-45046", online: https://cve.mitre.org/cgi-bin/cvename.cgi?name=CVE-2021-45046, accessed Jan. 30, 2023, 3 pagers, The Mitre Corporation.

"CVE-2021-45105", online: https://cve.mitre.org/cgi-bin/cvename.cgi?name=CVE-2021-45105, accessed Jan. 30, 2023, 2 pages, The Mitre Corporation.

"Vulnerabilities in Apache Log4j Library Affecting Cisco Products: Dec. 2021", online: https://sec.cloudapps.cisco.com/security/center/content/CiscoSecurityAdvisory/cisco-sa-apache-log4j-qRuKNEbd, Jan. 31, 2022, 11 pages, Cisco Systems, Inc.

Bouwmans, Thierry, "Background Subtraction for Visual Surveillance: A Fuzzy Approach", University of La Rochelle, La Rochelle, France, downloaded by [Universite Laval] at 14:26 May 14, 2016, 36 pages.

\* cited by examiner

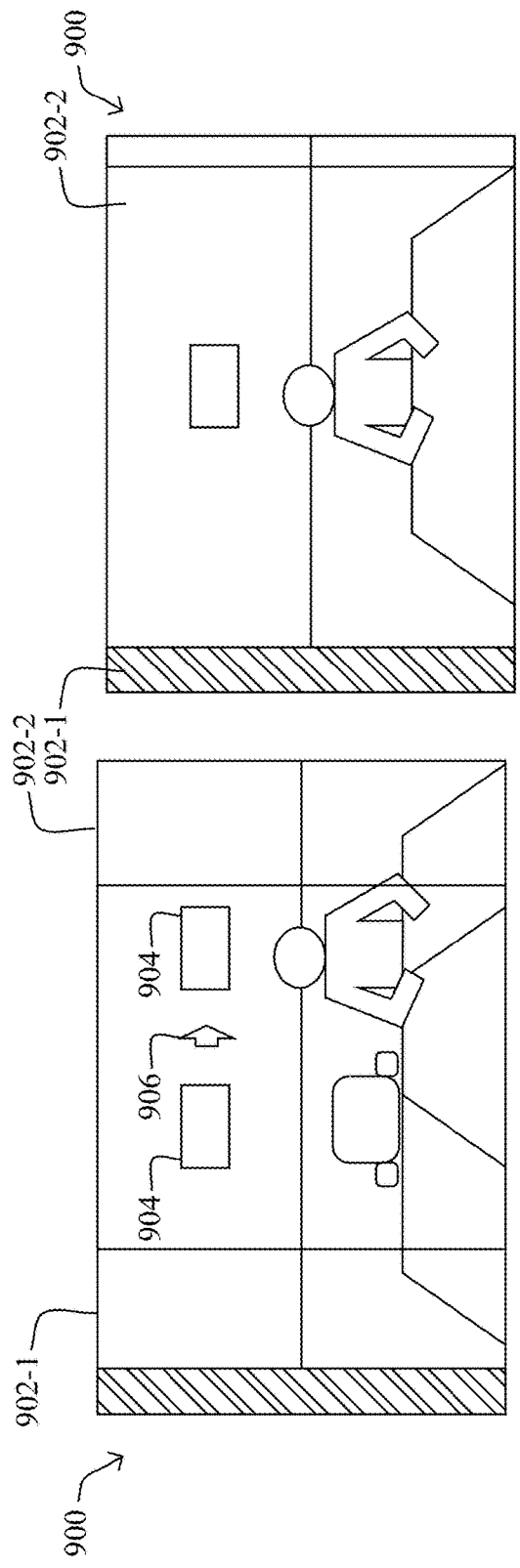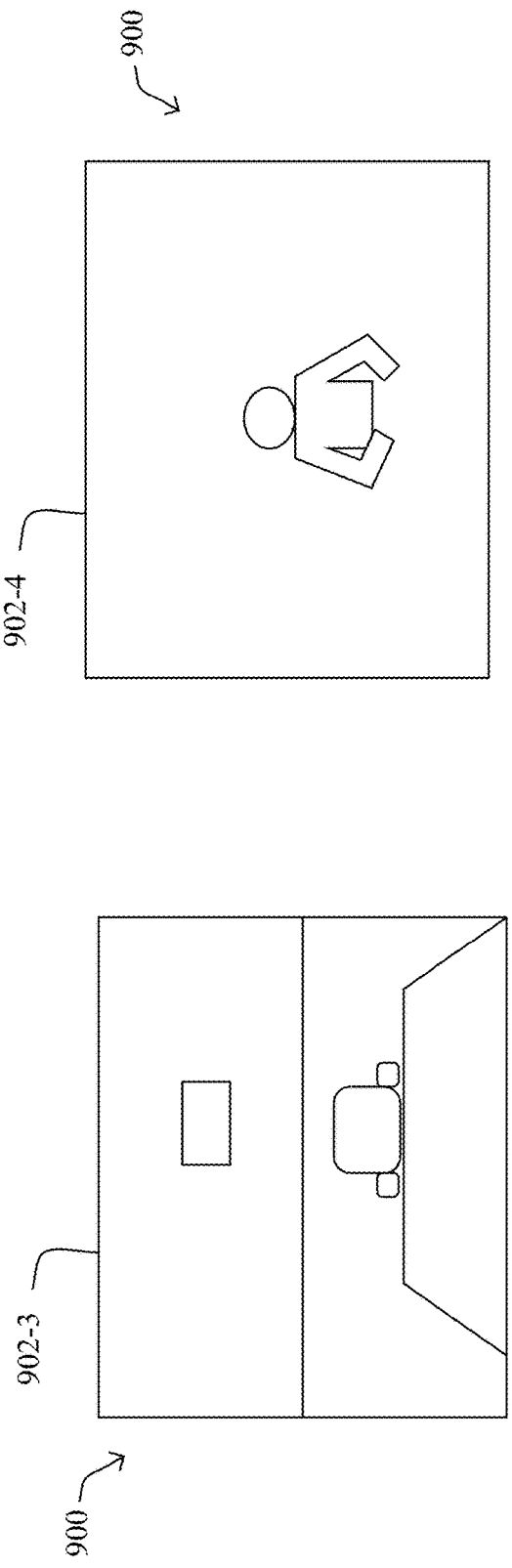
FIG. 9A
FIG. 9B
FIG. 9C
FIG. 9D

DETERMINISTIC OBJECT ALIGNMENT FOR BACKGROUND REMOVAL

TECHNICAL FIELD

The present disclosure relates generally to computer networks, and, more particularly, to deterministic object alignment for background removal.

BACKGROUND

Video conferencing has transformed the way the world lives, works, and communicates. Video conferencing has achieved this transformation by facilitating virtual collaboration among geographically dispersed people using little more than a network connection and video conferencing equipment. As the adoption of video conferencing expands, video conferencing application developers strive to include features that make the video conferencing experience more adaptive, immersive, and customizable.

One such feature is background removal and/or foreground retrieval (e.g., isolation, extraction, etc.). This feature can be useful in a variety of ways ranging from allowing users to change their background during a video conference to extracting foreground subjects (e.g., people, objects, etc.) for use as a hologram image.

However, current approaches to background removal and/or foreground retrieval largely fall into one of two camps. In the first camp, there is the automated pixel-based brute force approach which is incredibly computationally expensive. In the second camp, there is the manual approach which requires a user to manually implement calibration procedures in advance of a conference, resulting in an unadaptable calibration that must be repeated every time conditions change. As such, current approaches to providing background removal and/or foreground retrieval adversely impact video conferencing performance and user experience.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 9A-9D illustrate examples of deployments of an architecture for deterministic object alignment for background removal, according to various embodiments.

DESCRIPTION OF EXAMPLE EMBODIMENTS

Overview

According to one or more embodiments of the disclosure, a device may obtain a user-free first image of a background portion of a physical environment including a deterministic object. The device may then locate the deterministic object in a second image of the physical environment. The device may then generate, based on the deterministic object, an alignment between the user-free first image and the second image. The device may then use the alignment for background removal in subsequent images of the physical environment.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
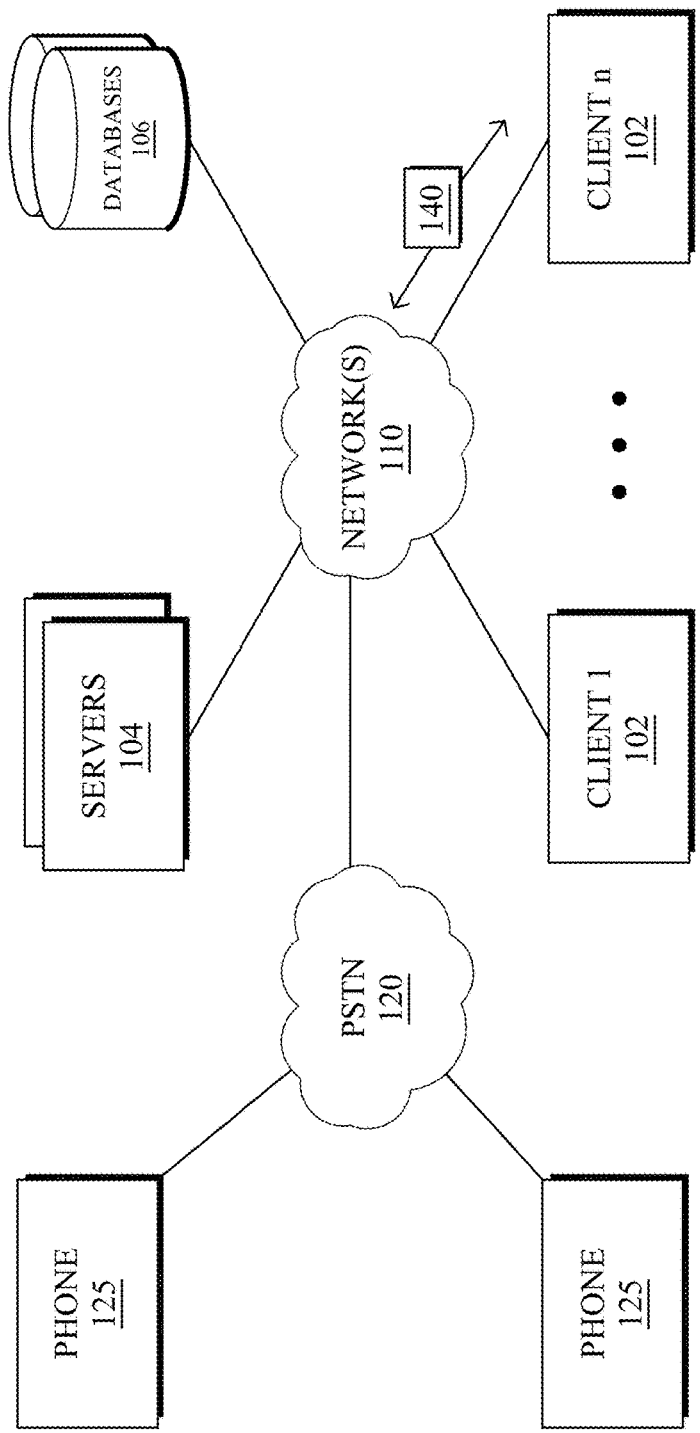
FIG. 1 illustrates an example communication network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, collaboration endpoints, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

In addition, a separate public switched telephone network (PSTN) 120 may also be considered to be a part of computing system 100, namely where phones 125 connect to the PSTN 120 in a standard manner (e.g., landlines, cellphones, and so on). The PSTN may be based on any number of carrier telephone networks which provide a connection to computer network 110 for things such as conference calls, video calls, calls to voice over IP (VOIP) end points, and so on, as will be readily understood by those skilled in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
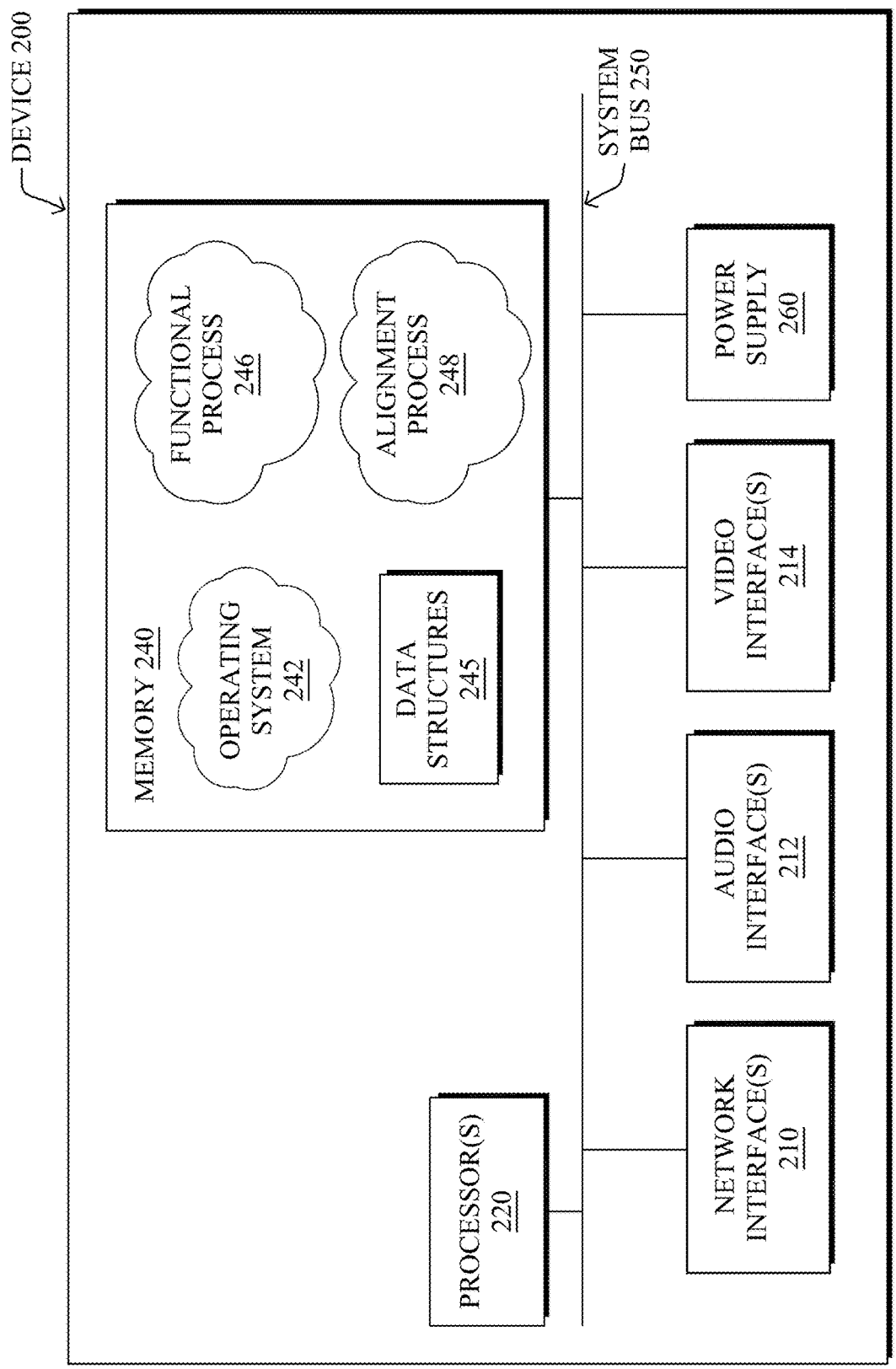
FIG. 2 illustrates an example network device/node.

FIG. 2 is a schematic block diagram of an example node/device 200 that may be used with one or more embodiments described herein, e.g., as any of the devices 102-106 shown in FIG. 1 above. Device 200 may also be any other suitable type of device depending upon the type of network architecture in place, such as a collaboration endpoint, "receiver" (herein), etc. Device 200 may comprise one or more network interface 210, one or more audio interfaces 212, one or more video interfaces 214, one or more processors 220, and a memory 240 interconnected by a system bus 250, and is powered by a power supply 260.

The network interfaces 210 include the mechanical, electrical, and signaling circuitry for communicating data over physical links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

The audio interfaces 212 may include the mechanical, electrical, and signaling circuitry for transmitting and/or receiving audio signals to and from the physical area in which device 200 is located. For instance, audio interfaces 212 may include one or more speakers and associated circuitry to generate and transmit soundwaves. Similarly, audio interfaces 212 may include one or more microphones and associated circuitry to capture and process soundwaves.

The video interfaces 214 may include the mechanical, electrical, and signaling circuitry for displaying and/or capturing video signals. For instance, video interfaces 214 may include one or more display screens. At least one of the display screens may comprise a touch screen, such as a resistive touchscreen, a capacitive touchscreen, an optical touchscreen, or other form of touchscreen display, to allow a user to interact with device 200. In addition, video interfaces 214 may include one or more cameras, allowing device 200 to capture video of a user for transmission to a remote device via network interfaces 210. Such cameras may be mechanically controlled, in some instances, to allow for repositioning of the camera, automatically.

The memory 240 comprises a plurality of storage locations that are addressable by the processor(s) 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative alignment process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

For web-based conferencing services, such as a videoconference, teleconference, one-on-one (e.g., VoIP) calls, and so on, functional process 246 may be configured to allow device 200 to participate in a virtual meeting/conference during which, for example, audio data captured by audio interfaces 212 and optionally video data captured by video interfaces 214 is exchanged with other participating devices of the virtual meeting (or a videoconference) via network interfaces 210. In addition, conferencing processes may provide audio data and/or video data captured by other participating devices to a user via audio interfaces 212 and/or video interfaces 214, respectively. As would be appreciated, such an exchange of audio and/or video data may be facilitated by a web conferencing service (e.g., Webex by Cisco Systems, Inc., etc.) that may be hosted in a data center, the cloud, or the like.

Figure 3:
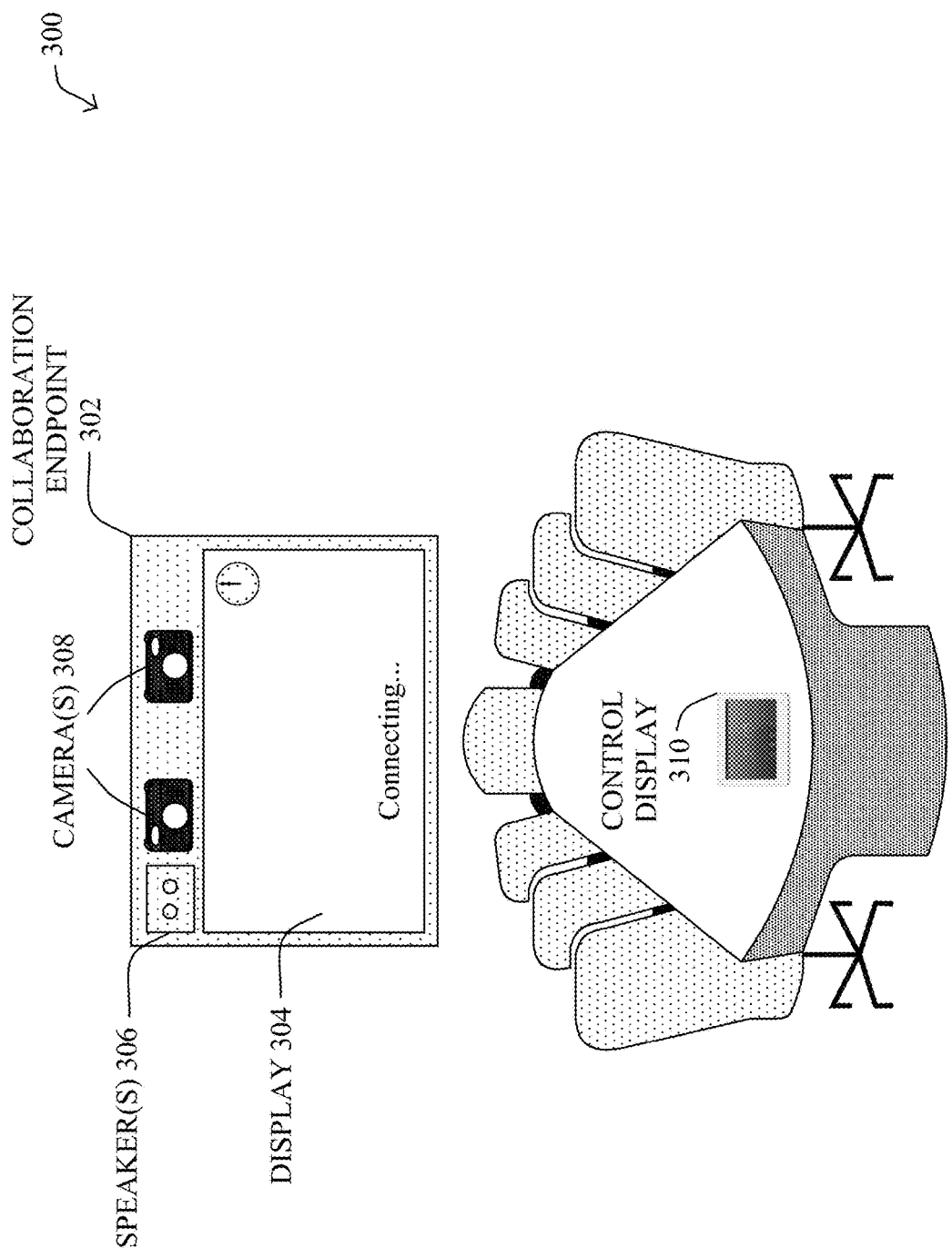
FIG. 3 illustrates various example components of an illustrative videoconferencing system.

For instance, FIG. 3 illustrates an example meeting room 300 in which a collaboration endpoint 302 is located, according to various embodiments. During operation, collaboration endpoint 302 may capture video via its one or more cameras 308, audio via one or more microphones, and provide the captured audio and video to any number of remote locations (e.g., other collaboration endpoints) via a network. Such videoconferencing may be achieved via a videoconferencing/management service located in a particular data center or the cloud, which serves to broker connectivity between collaboration endpoint 302 and the other endpoints for a given meeting. For instance, the service may mix audio captured from different endpoints, video captured from different endpoints, etc., into a finalized set of audio and video data for presentation to the participants of a virtual meeting (or a videoconference). Accordingly, collaboration endpoint 302 may also include a display 304 and/or speakers 306, to present such data to any virtual meeting (or a videoconference) participants located in meeting room 300.

Also as shown, a control display 310 may also be installed in meeting room 300 that allows a user to provide control commands for collaboration endpoint 302. For instance, control display 310 may be a touch screen display that allows a user to start a virtual meeting, make configuration changes for the videoconference or collaboration endpoint 302 (e.g., enabling or disabling a mute option, adjusting the volume, etc.).

In some cases, any of the functionalities of collaboration endpoint 302, such as capturing audio and video for a virtual meeting (or a videoconference), communicating with a videoconferencing service, presenting videoconference data to a virtual meeting participant, etc., may be performed by other devices, as well. For instance, a personal device such as a laptop computer, desktop computer, mobile phone, tablet, or the like, may be configured to function as an endpoint for a videoconference (e.g., through execution of a videoconferencing client application), in a manner similar to that of collaboration endpoint 302.

Figure 4:
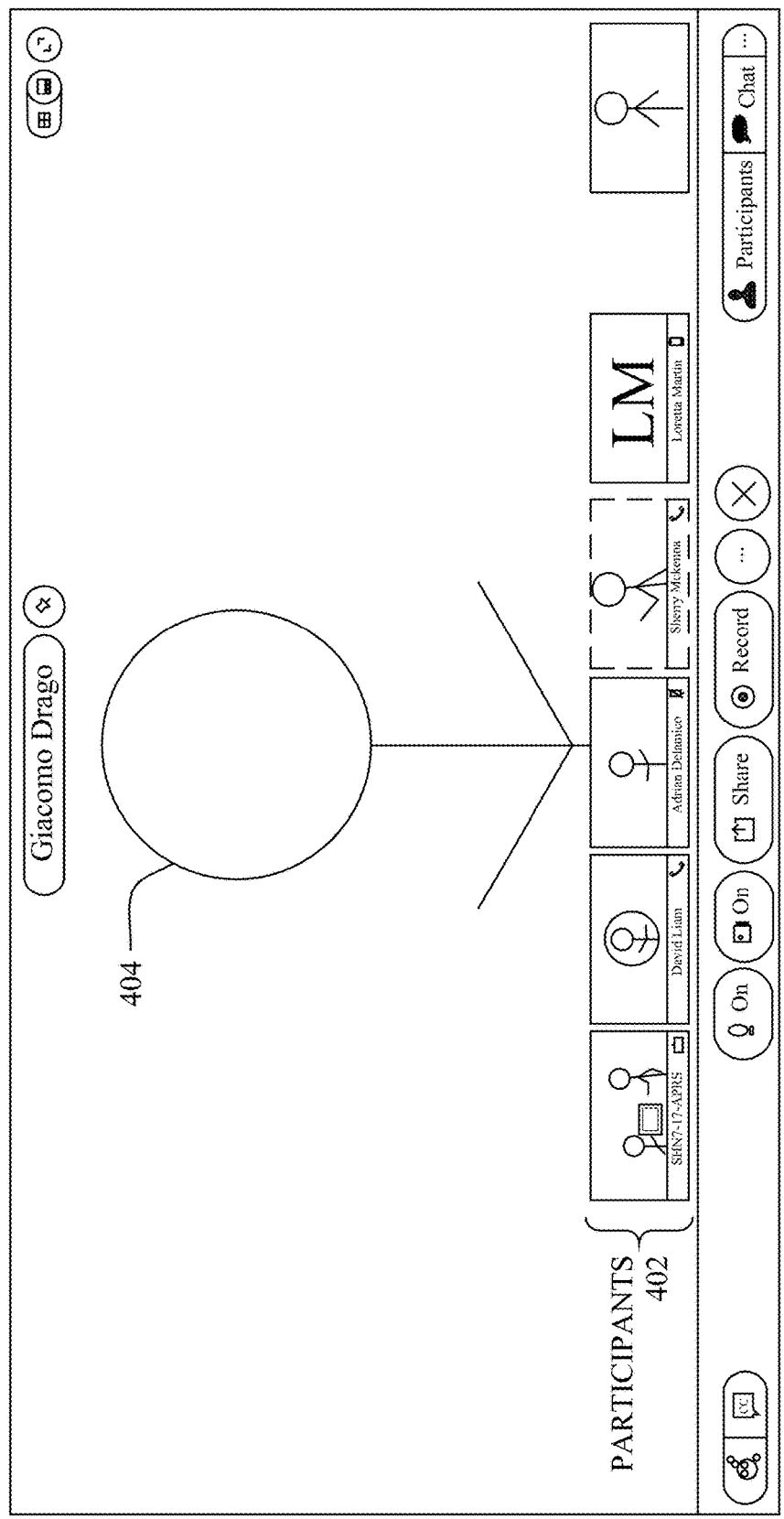
FIG. 4 illustrates an example display of a virtual meeting (or a videoconference)

In addition, FIG. 4 illustrates an example display 400 of a virtual meeting (or a video conference), according to various embodiments. As shown, video for participants 402 may be presented in conjunction with that of a presenter 404. For instance, video data for each of participants 402 (e.g., video captured by each of their respective cameras) may be presented along the bottom of the displayed conference, along a side of the displayed conference, or the like. Typically, the host or presenter of the videoconference, may be displayed in a prominent location on screen, with their video appearing much larger than that of participants 402. This may be considered a stage or presenter mode of the virtual meeting. However, other presentation modes are contemplated, for instance, where each participant shares an equal amount of the displayed conference, or where the current speaker is shown in the prominent view.

In some examples, the presenter 404 may be presented with a virtual background image. That is, the video feed of the presenter 404, with the physical background removed, may be presented superimposed over a virtual background.

In some instances, the presenter 404 may be presented in an extended reality (XR) format, such as a holographic image. In such instances, only the presenter 404, with the physical background removed, may be presented as a hologram.

Other styles, configurations, and operations of web conferences, presentations, calls, and so on may be understood by those skilled in the art, and those shown and described above are merely examples that are not meant to be limiting to the scope of the present disclosure.

As noted above, current approaches to background removal and/or foreground retrieval for video conferencing impose substantial performance penalties and/or user experience penalties on video conferencing applications. For instance, pixel-based alignment approaches search for alignment where most pixels agree. These approaches involve brute-force or gradient decent. Brute-force techniques are unrealistic in video conferencing due to the computational overhead, which is at least $O(N^4)$. Gradient decent techniques assume images are almost aligned within only a few pixels, which is too limited for practical purposes in virtual conferencing.

Alternatively, manual approaches can involve capturing a background image ahead of time without the foreground subject. This requires a user to position the video conferencing equipment in the physical environment where the video conference will be conducted, vacate the premises, and/or actuate the capture of the background image once vacated. Obviously, this is a cumbersome procedure and further suffers from the inconvenience that the user must repeat this procedure every time the background changes, lighting changes, and/or the camera angle shifts even slightly. This can lead to high levels of user frustration and low levels of user adoption.

As a result, present approaches to background removal and/or foreground isolation and/or extraction yield subpar background removal and/or foreground retrieval results and frustrated consumers.

Deterministic Object Alignment for Background Removal

The techniques herein provide enhanced background removal and/or foreground retrieval in video conferences by capturing user-free background images when the room is unoccupied and aligning these images as needed in an automated manner. With these background images, not only is the user extracted, but so too are all foreground objects, even if the user does not directly touch those objects all the time. These techniques may be used to extract subjects (e.g., users, objects, etc.) from a video feed such as may be used in video conferencing and/or holographic video conferencing. For example, the extracted subjects may include a trainer and objects used for instructional training. In the instructional training the trainer may interacts with the objects (e.g., equipment, parts, tools, etc.) on a desk and a holograph of the trainer and the objects may be presented to a trainee.

Illustratively, the techniques described herein may be performed by hardware, software, and/or firmware, such as in accordance with alignment process 248, which may include computer executable instructions executed by the processor 220 (or independent processor of interfaces 210) to perform functions relating to the techniques described herein.

Specifically, according to one or more embodiments of the disclosure as described in detail below, a device may obtain a user-free first image of a background portion of a physical environment including a deterministic object. The device may locate the deterministic object in a second image of the physical environment. The device may generate, based on the deterministic object, an alignment between the user-free first image and the second image. The device may use the alignment for background removal in subsequent images of the physical environment.

Figure 5:
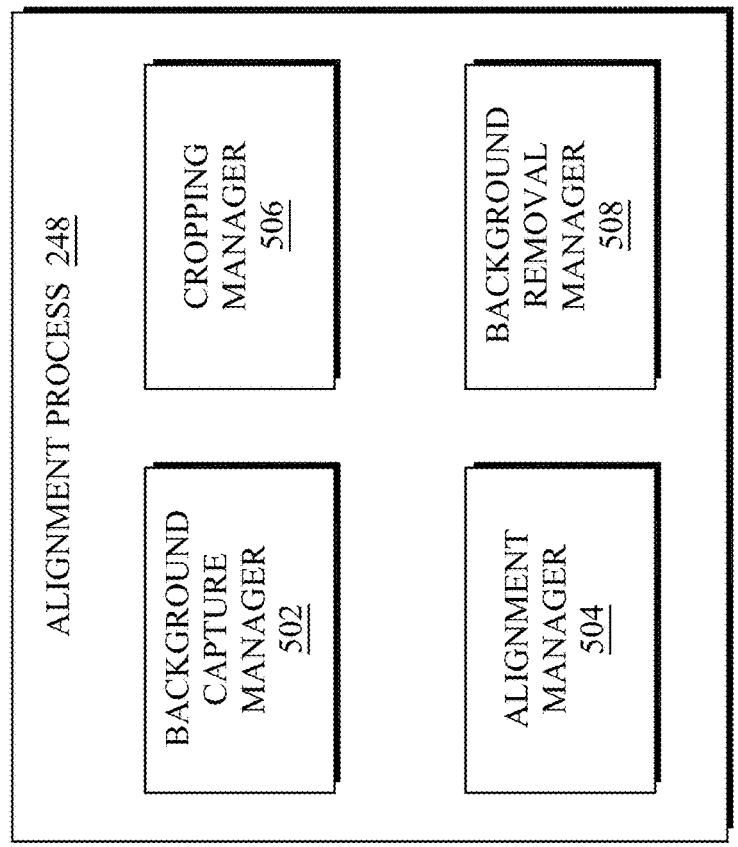
FIG. 5 illustrates an example of an architecture for deterministic object alignment for background removal.

Operationally, FIG. 5 illustrates an example of an architecture 500 for deterministic object alignment for background removal, according to various embodiments. At the core of the architecture is alignment process 248, which may be executed by a device that provides a video conferencing service in a network, or another device in communication therewith. In general, the alignment process 248 may be executed to configure a video conferencing experience and/or video conferencing equipment during a video conferencing session and, therefore, may be executed on any device associated with the delivery of the video conferencing session including holographic and/or other extended reality (XR) video conferencing equipment.

As shown, alignment process 248 may include background capture manager 502, alignment manager 504, cropping manager 506, and/or background removal manager 508. As would be appreciated, the functionalities of these components may be combined or omitted, as desired. In addition, these components may be implemented on a singular device or in a distributed manner, in which case the combination of executing device can be viewed as their own singular device for purposes of executing alignment process 248.

During execution, background capture manager 502 may manage the capture of a background image of a physical environment. The physical environment may include a physical environment where a video conference has been, will be, and/or is being attended. This may include an office, a video conferencing conference room, a holographic video conferencing pod, etc.

The background image may include one or more images of the physical environment that are free from what will ultimately be considered as the foreground portions of the environment. This can mean that the background image is an image of the physical environment in which a user attends a video conference without the user and/or without any objects that the user wishes to handle or display as part of the foreground.

For example, the physical environment may include a chair at a desk in front of a conference room wall where the user will be seated to present an object via video conference. In such an example, the background may include the chair, the desk, and/or the conference room wall, whereas the foreground may include the user and the object. It should be appreciated that in some examples a chair and/or portions of a chair may be a foreground object instead of a background object since it may be computationally more efficient to treat the chair as part of the user since the user may be sitting in it and/or the chair may be moving with the user.

Therefore, the background image may be an image of the chair, desk, and/or the conference room wall captured without the user and/or without the object physically present in the environment (e.g., within the field of view of one or more image capture devices capturing the images for the video conference). The one or more image capture devices may include a camera used to collect the images as a video feed for the video conference.

Unlike previous approaches that require a user to perform a background image capture procedure, background capture manager 502 may be executed to capture the background image automatically and/or without user intervention. Background capture manager 502 may, for example, cause the background image to be automatically captured in response to one or more occupancy conditions for the physical environment.

For example, background capture manager 502 may use any number of detection techniques (e.g., light-based, acoustic, pressure, radar, video image processing, signal tracking, self-identification, facial recognition/identification/detection, etc.) to detect the presence of participants of a video conferencing session in a conferencing space (e.g., conference room, office, room, holographic video conferencing pod, etc.). For instance, background capture manager 502 may use one or more sensors, such as cameras, proximity sensors, Wi-Fi based occupancy sensors, Bluetooth Low Energy (BLE) based occupancy sensors, motion sensors, etc., to detect human presence in a room.

Background capture manager 502 may cause a user-free background image of the physical environment to be captured responsive to detecting that the physical environment is vacant (e.g., that no user is present in the room, that no user is present in the field of view of the image capturing device capturing the background image, etc.). Capturing the background image may include locally saving the captured user-free background image for use in future background removal and/or foreground retrieval procedures. For example, the user-free background image may be used to remove the background and/or retrieve the foreground of subsequently captured images captured when the user returns to the physical environment to conduct the video conferencing session (e.g., start the video conferencing session, start a next video conferencing session, continue an ongoing video conferencing session, etc.).

Moreover, background capture manager 502 may be conceptualized as operating according to an assumption that whenever a human presence is detected, the background may be altered in some way (e.g., furniture has been moved, etc.) and/or an image capture device may be displaced. As such, whenever a user is detected in the physical background, the background capture manager 502 may cause an updated user-free background image to be captured the next time that it detects that the physical environment is vacant. That is, background capture manager 502 may cause an updated user-free background image of the physical environment to be captured responsive to detecting that the physical environment is vacant after having previously captured a user-free background image and having detected an intervening user occupancy of the physical environment. In this manner, background capture manager 502 may operate to ensure that a most up-to-date user-free representation of the background is being used without requiring constant monitoring of the configuration of the background.

If, however, the user alters the background without ever leaving the physical environment (e.g., adjusts the camera while sitting in front of it), the latest user-free background image may no longer offer an optimal background for background removal and/or foreground retrieval. Typically, alterations to the background while the user is still occupying it are minor and the latest user-free background image should provide sufficiently high levels of background removal and/or foreground retrieval given the computational savings tradeoff. Though, in various embodiments, a computationally lightweight method of background alteration detection may be incorporated into alignment process 248 such that detection of a modification to the background of the physical environment that exceeds a change threshold over the latest user-free background image may trigger an error and/or prompt a user to manually capture a new user-free background image.

During execution, alignment manager 504 may manage an alignment of the user-free background image to subsequent images (e.g., images of a video feed of the video conference session) in the same physical environment. This alignment may be used for the purposes of background removal and/or foreground retrieval on those subsequent images.

Managing the alignment may include generating an alignment between the user-free background image from a camera to subsequent images captured from the camera for a video conferencing session. By aligning the user-free background image from a camera to subsequent images including foreground subjects (e.g., humans, objects, etc.) captured from the camera, the foreground subjects may be able to be discriminated from the background since they are missing in the user-free background reference image. That is, the user-free background image may act as a reference that defines what comprises the background in the image capture of the physical environment such that subjects in the subsequent images that were not present in the user-free background image may be identified and/or isolated from the subsequent images.

Alignment manager 504 may use deterministic objects located within the user-free background image and/or the subsequent images as spatial references to achieve alignment between the images. A deterministic object may be a real physical world object that may be located in the physical environment. Specifically, the deterministic object may be located in the background of the physical environment. More specifically, the deterministic object may be positioned in a fixed location of the background where it will remain before and/or during the video conference. The fixed location may be a location within the field of view of the one or more image capture devices that capture the images of the user-free background and/or the subsequent images for a video conference session.

In various embodiments, the deterministic object may be positioned within the physical environment such that it will remain within the field of view of the one or more image capture devices throughout the video conference session. For example, the deterministic object may be located within this field of view in a location that is unlikely to be obstructed by a foreground subject during the video conferencing session. For instance, the deterministic object may be fixed in place on a wall that will appear in the background of the physical environment at a sufficient height that it will remain visible in the field of view above any user and/or object.

The deterministic object may be any object that is distinctly identifiable within the background of the physical environment. For example, the deterministic object may be a predefined marker or even a custom marker conforming to a predefined design template. For example, the deterministic object may include a placard which may be emblazoned with a symbol such as a company logo of a user according to a predefined design template.

The deterministic object may have one or more pre-defined and/or recognizable geometric features. The geometric features may include one or more points. In various embodiments, the point may include vertices of the deterministic object (e.g., four corners of a square or a rectangle).

Alignment manger 504 may search for and/or identify instances of the deterministic object and/or the location of its corresponding geometric features in each image or frame of a video conferencing video feed. In some examples, alignment manager 504 may employ deep neural network (DNN) models trained to identify the deterministic object and/or its geometric features to accomplish this operation.

For example, the deterministic object may be a rectangular placard that resembles a pre-defined design template of a blue rectangle with a custom logo on it. The corresponding points of this deterministic object may be the four vertices of the rectangle placard.

Alignment manager 504 may use, for example, a generic DNN model that looks for any logoed blue rectangle resembling the template to identify the deterministic object within the user-free background image and/or the subsequent images. Alternatively, a custom-tailored DNN model may be used that looks specifically for the custom logo within the blue rectangle to identify the deterministic object within the user-free background image and/or the subsequent images. Specifically, the model may be used to identify the coordinates of each of the geometric features of the deterministic object in each of the images.

Once alignment manager 504 has identified the deterministic object and/or the location of its geometric features within the images, it may use the location of these geometric features across the user-free background image and/or the subsequent images to determine an image displacement and/or image capture device displacement. The image capture device displacement and/or image displacement may be calculated by alignment manager 504 using a homography-based technique to relate the transformation between the planes of the two images to retrieve a displacement. For example, by comparing the coordinates of the geometric features such as each of the vertices of the deterministic object within the user-free background image and/or the subsequent images, alignment manager 504 may detect a positional shift of the deterministic object within the field of view of the one or more image capturing devices capturing those images.

This positional shift can be, for example, the result of a user adjusting the camera angle after the user-free background image was captured. For instance, if the coordinates of the geometric features of the deterministic object shifted up and to the right relative to the coordinates of the same object in the user-free background image, this may indicate that the user shifted the camera angle down and to the left sometime between when the user-free background image was captured and the image demonstrating the shift was captured.

Alignment manager 504 may determine whether the detected positional shift of the deterministic object is acceptable. For example, alignment manager 504 may compare the amount of positional shift of the deterministic object to an acceptable positional shift amount range or threshold to determine if it is acceptable. In some examples, the alignment manager 504 may compare the amount of positional shift relative to the size of the image to a threshold percentage of image size (e.g., ten percent of image size) to determine if it is acceptable.

If the alignment manager 504 determines that the positional shift of the deterministic object is acceptable, then the alignment manager 504 may proceed with the alignment operations described below using the user-free background image. Alternatively, if the positional shift of the deterministic object is not acceptable, then alignment manager 504 may generate a warning and/or prompt a user to manually capture a new user-free background image to continue.

Once the alignment manager 504 determines that the positional shift of the deterministic object is acceptable, it may perform an alignment operation to align the user-free background image to a subsequent image. This alignment operation may be achieved using a homography-based alignment technique.

For example, once the homography is determined for the user-free background image and/or the subsequent images using the location of the geometric features of the deterministic object across the user-free background image and/or the subsequent images, the determined homography may be applied to the user-free background image to rectify the user-free background image plane and the image plane of the subsequent image. For instance, alignment manager 504 may apply the detected homography value to the saved user-free background image to warp the saved user-free background image into a warped user-free background image. That is, the saved user-free background image may be warped according to the detected homography value so that in its warped state it better corresponds to the new camera angle (e.g., the camera and/or image displacement featured in the subsequent image).

Alignment manager 504 may then align the warped user-free background image with the subsequent image. Alignment manager 504 may achieve this alignment by overlaying the warped user-free background image with the subsequent image such that the geometric features of the deterministic object in the warped user-free background image are aligned with (e.g., overlay) the same corresponding geometric features of the same deterministic object in the subsequent image.

During execution, cropping manager 506 may manage cropping of the aligned warped user-free background image and/or subsequent image (e.g., as aligned by alignment manager 504). Managing cropping may include identifying the effective overlapping and/or non-overlapping area in the aligned warped user-free background image and/or subsequent image. Cropping manager 506 may cause all non-overlapping areas in the aligned warped user-free background image and/or subsequent image to be cropped from the images.

During execution, background removal manager 508 may manage removal of the background and/or retrieval of foreground from the subsequent images. Again, the subsequent images may be images or frames of a live video stream of a videoconference session and the foreground may include subjects (e.g., users, objects, etc.) that are engaged in and/or part of the videoconference session. Managing the removal of the background and/or retrieval of foreground from the subsequent images may include using the cropped warped user-free background image as a reference image by which background portions of the subsequent images and/or foreground portions of subsequent images are identified.

In various embodiments, background removal manager 508 may remove the background portions and/or retrieve the foreground portions of the subsequent images based on the cropped warped user-free background image. Background removal manager 508 may then cause the retrieved foreground portions of the subsequent images to be presented, sans the background portion, in the ongoing video stream and/or as a hologram image to other participants of the video conferencing session.

In some embodiments, the foreground portion of the subsequent images need to stay within the cropped field of vision represented by the cropped warped user-free background image. In such embodiments, this relationship may inform the pre-defined thresholds used by alignment manager 504 to determine whether the positional shift of the deterministic object is acceptable.

For example, a permissible amount of camera shift to still ensure that the foreground subjects remain in the field of vision represented by the cropped warped user-free background image may be calculated based on the size of the cropped warped user-free background image, the size of the cropped portion of the cropped warped user-free background image, the size relationship between the cropped warped user-free background image and/or the subsequent image, the size of the subsequent image, etc. This calculation may yield, for example, a maximum permissible percentage of an image size by which the camera and/or deterministic object location in an image may shift to still be included in the field of view of the cropped warped user-free background image. This percentage may then be used to define a positional shift acceptability threshold for use by alignment manager 504.

In contrast to approaches that use arbitrary portions of images for alignment, alignment process 248 uses corresponding point locations of a known object across images. This approach yields a more deterministic alignment between images and produces result that greatly reduce potential errors.

Figure 6A:
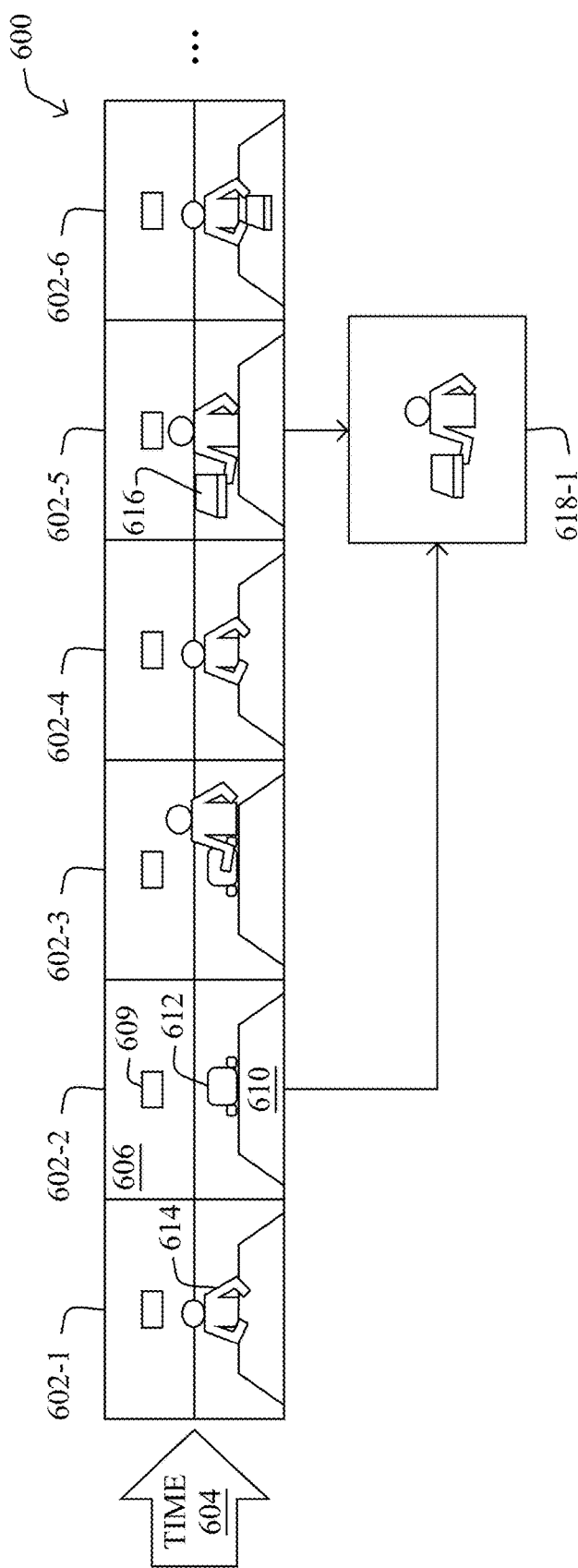
FIGS. 6A-6B illustrate examples of deployments of an architecture for deterministic object alignment for background removal.
Figure 6B:
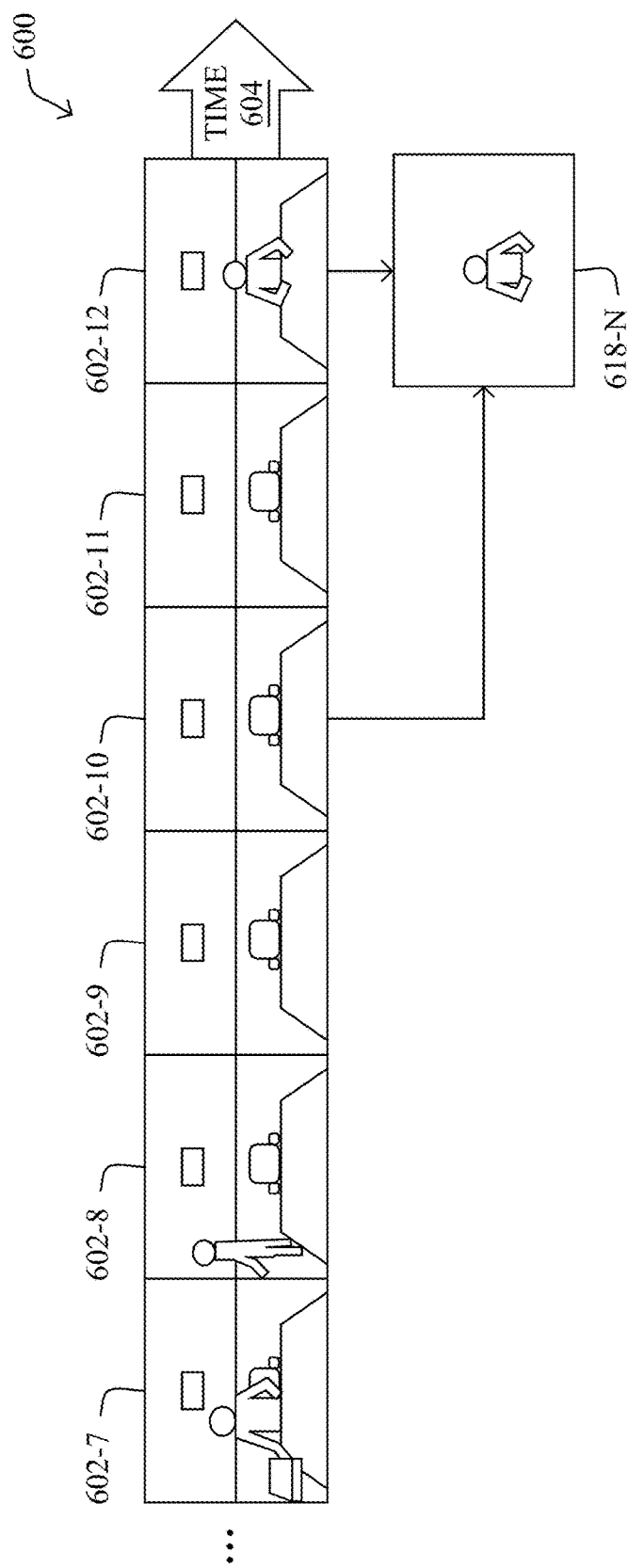

FIGS. 6A-6B illustrate examples of deployments 600 of an architecture (e.g., architecture 500 in FIG. 5) for deterministic object alignment for background removal, according to various embodiments. Specifically, deployment 600 illustrates an example of an automated user-free background image capture feature, such as is described above with respect to the execution of background capture manager 502 of FIG. 5.

The deployment 600 includes a series of images 602 (e.g., images 602-1 . . . 602-N) consecutively captured by an image capture device over a span of time 604. Each of the images 602 may be an image and/or a frame of a video feed for a videoconferencing session.

Each of the images 602 may be an image of a physical environment captured from an image capture device. For example, each of the images 602 may be images of a conference room where a video conferencing session is attended. These images 602 may be captured by one or more video conferencing cameras.

Each of the images 602 may include a background portion. The background portion may include incidental and/or environmental subjects that are not the subject of the video conferencing session. The background may be the portions of the physical environment that are not relevant to and/or of interest to the video conferencing session. That is, the background may be the portion of the physical environment that is other than the foreground subjects (e.g., people, objects, etc.) that are to be featured in the video conferencing session. In some examples, the background may include a wall 606, a deterministic object 609, and/or furniture such as a table 610 and/or a chair 612.

Some of the images 602 may include a user 614. A user 614 may be a human participant of the video conferencing session. The user 614 may be a foreground subject that is one of the subjects of the video conferencing session. Additionally, some of the images 602 may include an object 616. Unlike deterministic object 609, object 616 may be a foreground subject that is one of the subjects of the video conferencing session. For example, object 616 may be a product, part, tool, etc. that is being presented and/or discussed in the video conferencing session.

As previously described, one or more sensors may be utilized to detect the presence of a user 614 in a physical environment. Image 602-1 of the physical environment may correspond to a moment when user 614 is detected in the physical environment (e.g., User Detected). In some examples, this may be a time before the beginning of the video conference. In some instances, a scheduling manager may monitor video conferencing schedules and may activate occupancy sensors a preset amount of time before a video conference is scheduled. In such an example, image 602-1 may correspond to a moment when the user is first detected in the physical environment advance of the video conference. In other examples, image 602-1 of the physical environment may correspond to a moment during the video conference session.

Image 602-2 of the physical environment may correspond to a moment when the user 614 is no longer detected in the physical environment and/or the physical environment is vacant (e.g., Vacancy). As such, image 602-2 may comprise a user-free background image including only the background elements devoid of any foreground subjects. Upon detecting that user 614 is no longer present after being previously detected in image 602-1, the user-free background image 602-2 may be captured and/or saved for subsequent use in background removal and/or foreground retrieval operations on subsequently captured images.

User 614, having returned to the physical environment after the capture of the user-free background image, may be detected once again in images 602-3 . . . 602-8 (e.g., User Detected). The saved user-free background image 602-2 may be used for background removal and/or foreground retrieval operations in any of the subsequently captured images 602-3 . . . 602-8.

For example, image 602-5 may include foreground subjects such as user 614 and/or object 616. The saved user-free background image 602-2 may be used for background removal and/or retrieval of user 614 and/or object 616 from image 602-5. These background removal and/or foreground retrieval operations may be performed using homography-based image isolation techniques based on saved user-free background image 602-2. As a result of these operations, user 614 and/or object 616 isolated from image 602-5 may be supplied as a foreground-only image 618-1, which can be communicated and/or presented to other users as a video stream image and/or a holographic image.

In various embodiments, the foreground retrieval process may not be applied to only a single subsequent image, but rather to each of the subsequent images in a continuous video stream. In examples where the user-free background image 602-2 is captured before the beginning of the video conference, it may be used for background removal and/or foreground retrieval on all subsequent images of the video conferencing session captured when user 614 renters the room to start the video conferencing session.

As previously mentioned, the automated user-free background image capture feature may operate under the assumption that any time user 614 has been detected in the physical environment, the image capture device capturing images 602 may have been moved and/or the background may have been altered in some manner. As such, when user 614 vacates the physical environment again after having previously been detected, then an updated user-free background image may be automatically captured.

For instance, user 614 may leave the physical environment after having been detected in the physical environment as captured in images 602-3 . . . 602-8 (e.g., User Detected). As a result, their absence may be detected such as in images 602-9 . . . 602-11 (e.g., Vacancy) where the environment is again vacant. Responsive to detecting this vacancy following a previous detection of user 614, an updated user-free background image 602-10 may be captured and/or saved. This updated user-free background image 602-10 may replace user-free background image 602-2 for purposes of future background removal and/or foreground retrieval operations.

Then, user 614 may again return to the physical environment after the capture of the updated user-free background image 602-10. User 614 may be detected once again in image 602-12 (e.g., User Detected). The saved updated user-free background image 602-10 may be used for background removal and/or foreground retrieval operations in subsequently captured image 602-12.

For example, image 602-12 may include foreground subjects such as user 614. The saved updated user-free background image 602-10 may be used for background removal and/or retrieval of user 614 from image 602-12. These background removal and/or foreground retrieval operations may be performed using homography-based image isolation techniques based on updated user-free background image 602-10. As a result of these operations, user 614 isolated from image 602-12 may be supplied as a foreground-only image 618-N which can be communicated and/or presented to other users as a video stream image and/or a holographic image.

Figure 7:
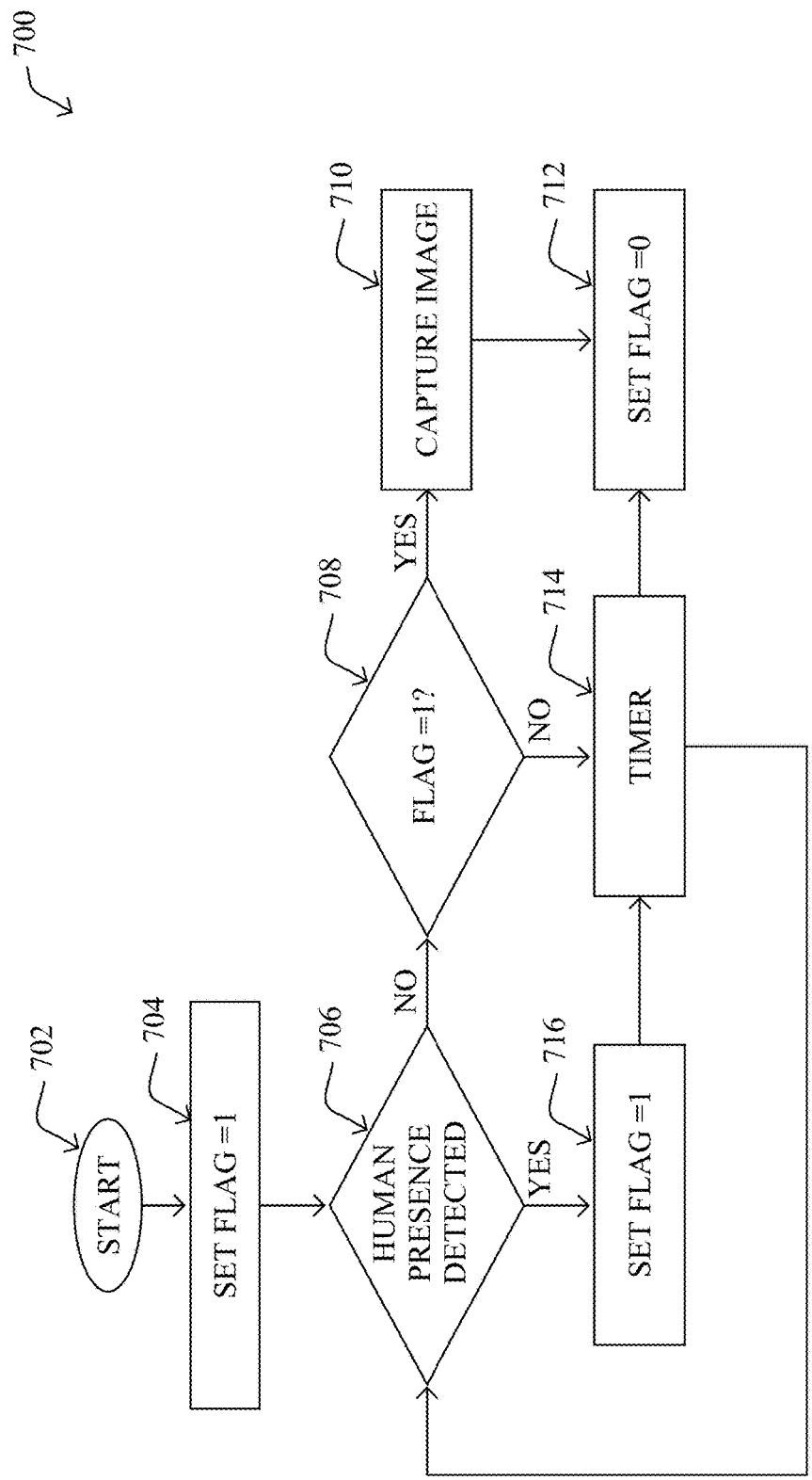
FIG. 7 illustrates an example of a process flow for deterministic object alignment for background removal.

FIG. 7 illustrates an example of a process flow 700 for deterministic object alignment for background removal, according to various embodiments. Specifically, flow 700 illustrates an example of steering logic for automated user-free background image capture as it relates to deterministic object alignment for background removal.

Flow 700 begins at box 702. In various embodiments, box 702 may correspond to launching of a video conferencing application and/or starting of a video conferencing session. Flow 700 may progress to box 704. At box 704, a flag value may be set. The flag value may operate as a finite state machine value that indicates whether a user-free background image of a physical environment needs to be captured. Since box 702 may correspond to starting a video conferencing application and/or a video conferencing session, box 704 may be part of the video conferencing application and/or video conferencing session start up procedure.

At box 704, the flag value may be set to a first state. For example, the flag value may be set to one. The flag value being set to the first state may indicate that a user-free background image of a physical environment needs to be captured. At this juncture, the user-free background image may not have yet been captured for a video conferencing session that is about to start or has already started.

Then, at box 706 it may be determined whether a human presence is detected in the physical environment. This determination may be based on data from one or more occupancy sensors in the physical environment detecting the presence of humans in the physical environment.

If a human presence is not detected at box 706, then the flow 700 may progress to box 708. At box 708, the flag state may be checked. If the flag state is set to the first state, then the flow 700 may progress to box 710.

At box 710, a user-free background image may be captured. For example, one or more cameras in the physical environment may capture and save a snapshot of the physical environment vacated of any foreground subjects that will be participating in a video conferencing session.

Then, the flow 700 may progress to box 712. At box 712 the flag value may be reset to a second state. For example, the flag value may be set to zero. The flag value being set to the second state may indicate that a user-free background image of a physical environment has been captured and another one is not needed at that time.

From box 712, the flow 700 may then proceed to box 714. At box 714 a timer may be started. The timer may operate to delay the progress of flow 700 to a next operation for a pre-defined amount of time. In this manner, computational savings and/or power savings may be realized by reducing how frequently each of the operations is performed with the time delay.

Once the time has expired, the flow 700 may progress back to box 706. At box 706, the determination of whether a human presence is detected in the physical environment may be repeated. As previously described, automated user-free background image capture process may have its logic structured such that any time a human is detected in the physical environment, it is assumed that the position of the image capturing device and/or background elements may have been altered in some way. As such, any time that a human is detected at box 706 the flag state may be reset to the first flag state to instigate the capture of an updated user-free background image.

For instance, coming through box 712 and box 714, the flag value may be in the second state indicating that the user-free background image has been captured. Arriving at box 706 a determination may be made that a human presence was detected causing the flow 700 to progress to box 716.

At box 716, the flag value may be reset to a first state. For example, the flag value may be set back to one from zero. The flag value being reset to the first state may indicate that an updated user-free background image of a physical environment needs to be captured the next time that the physical environment is detected to be vacant. The flow may then progress from box 716 back to box 714 to enforce a time delay until a next human presence detection determination is made at box 706.

As soon as the physical environment is determined to be vacant at box 706, then the flow 700 may progress to box 708. At box 708, the flag state may be checked. If the flag state is set to the first state, then the flow 700 may progress to box 710 where the updated user-free background image is captured.

Alternatively, when progressing through box 712 and box 714, the flag value may be in the second state indicating that the user-free background image has been captured and may progress to box 706 where a determination may be made that a human presence was not detected. In such examples, the flag value may remain in the second state and the flow 700 may progress to box 708.

At box 708, the flag state may be checked. Since the flag state in this example remains in the second state, then the flow 700 may progress to box 714 to await expiration of a timer until progressing back to box 706. In this manner, repetitive recaptures of user-free background images may be avoided. That is, since there have been no intervening detections of humans in the physical environment, the logic may be structured to assume that there is no need to capture an updated image since no human has been in the physical environment possibly reconfiguring it.

Figure 8A:
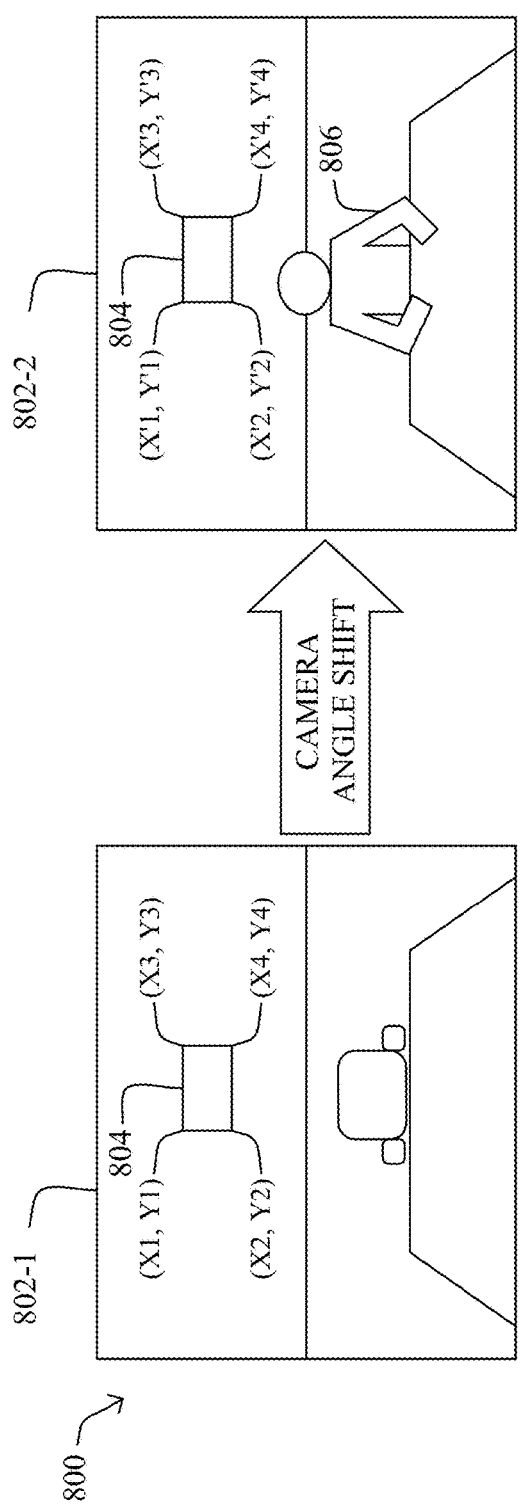
FIGS. 8A-8B illustrate examples of deployments of an architecture for deterministic object alignment for background removal.
Figure 8B:
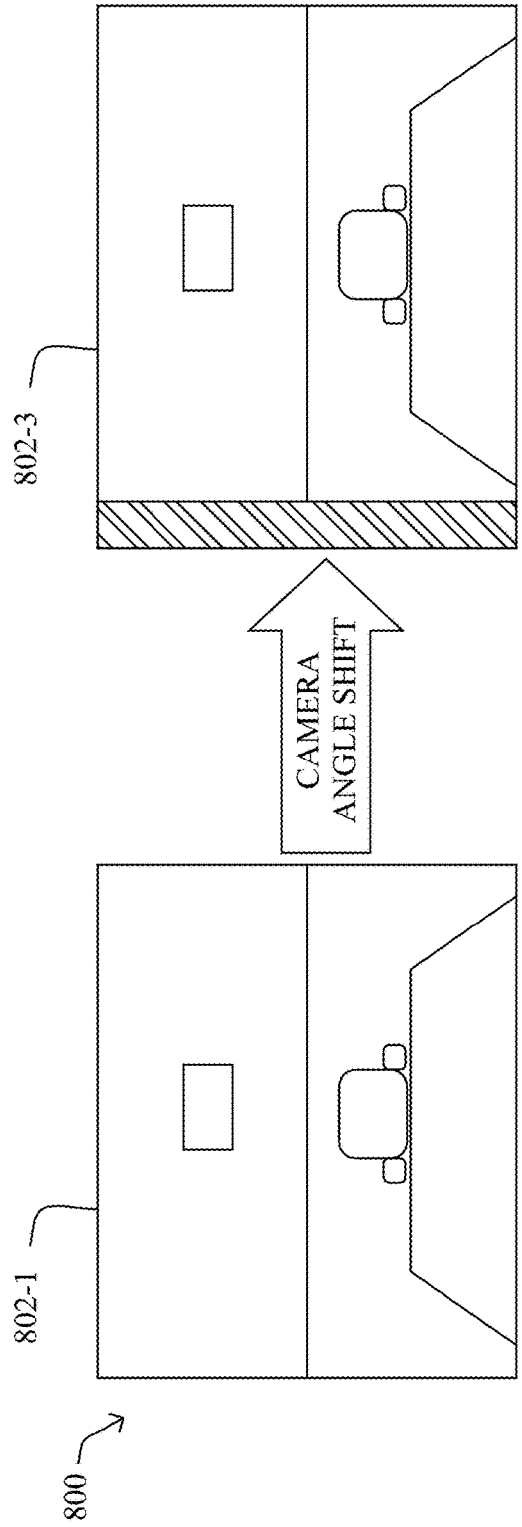

FIGS. 8A-8B illustrate examples of a deployment 800 of an architecture (e.g., architecture 500 in FIG. 5) for deterministic object alignment for background removal, according to various embodiments. Specifically, deployment 800 illustrates an example of an automated alignment feature, such as is described above with respect to the execution of alignment manager 504 of FIG. 5.

Deployment 800 may include images 802 (e.g., image 802-1 and image 802-2) of a physical environment of a video conferencing session as captured by one or more video conferencing cameras. The first image 802-1 may be the user-free background image captured and/or saved for subsequent background removal and/or foreground retrieval operations.

The first image 802-1 may include a deterministic object 804 that is located in the physical environment. The deterministic object 804 may be a placard or other object having a predefined appearance and/or geometry that resembles a recognition template for finding deterministic objects in an image. The deterministic object 804 may include one or more geometric features. For example, the deterministic object 804 may include one or more vertices that are individually identifiable.

A deterministic object identification operation may be performed on the first image 802-1. In some examples, this operation may include analyzing the first image 802-1 using a DNN model trained for deterministic object identification using, for example, a recognition template. This operation may identify the location of the deterministic object 804 within the first image 802-1. More specifically, this operation may identify the image coordinates of the geometric features of the deterministic object 804.

For example, an image coordinate of (X1, Y1) may be identified for a first geometric feature of the deterministic object 804 in first image 802-1. An image coordinate of (X2, Y2) may be identified for a second geometric feature of the deterministic object 804 in first image 802-1. An image coordinate of (X3, Y3) may be identified for a third geometric feature of the deterministic object 804 in first image 802-1. And an image coordinate of (X4, Y4) may be identified for a fourth geometric feature of the deterministic object 804 in first image 802-1.

The second image 802-2 may be an image of the same physical environment that is captured subsequent to the capture of the first image 802-1. The second image 802-2 may, therefore, feature some of the same background components. However, the second image 802-2 may include a user 806, as well. In various embodiments, the second image 802-2 may be an image or frame of a video conferencing video feed.

Of note, the angle of the camera capturing the physical environment may be shifted from the time it captured the first image 802-1 to the time it captured the second image 802-2. For example, perhaps the user 806 intentionally or unintentionally repositioned the camera upon reentering the physical environment. As a result, the angle and/or field of view featured in each of the images may be shifted relative to one another thereby resulting in a positional shift of subjects in the images. This may mean that the position of background subjects such as walls, office furniture, deterministic objects, etc. may have shifted between capturing the first image 802-1 and capturing the second image 802-2.

When performing an alignment operation between the first image 802-1 and the second image 802-1 for the purposes of background removal and/or foreground retrieval, this positional shift may be quantified and/or used to transform the first image 802-1 to a warped image 802-3.

The warped image 802-3 may be an image that better corresponds to the new camera angle. For example, the alignment operation may take a homography-based approach to identifying a transform applicable to the first image 802-1 to rectify it with the adjusted camera angle of the second image 802-2.

Therefore, a deterministic object identification operation may be performed on the second image 802-2. In some examples, this operation may include analyzing the second image 802-2 using the DNN model. As with the first image 802-1, this operation may identify the location of the deterministic object 804 within the second image 802-2 including the image coordinates of the geometric features of the deterministic object 804 in the second image 802-2.

For example, an image coordinate of (X'1, Y'1) may be identified for a first geometric feature of the deterministic object 804 in second image 802-2. An image coordinate of (X'2, Y'2) may be identified for a second geometric feature of the deterministic object 804 in second image 802-2. An image coordinate of (X'3, Y'3) may be identified for a third geometric feature of the deterministic object 804 in second image 802-2. And an image coordinate of (X'4, Y'4) may be identified for a fourth geometric feature of the deterministic object 804 in second image 802-2.

In an example scenario, before a video conferencing session takes place a user 806 happens to adjust the camera angle slightly after the user-free background image 802-1 was captured. This adjustment may be detected by comparing the image coordinates of the four geometric features, as identified by a DNN model, in the saved user-free background image of first image 802-1 to those in the subsequently captured second image 802-2. For instance, a homography may be obtained as a three-by-three matrix that can be used to transform the first image 802-1 into a warped image 802-3 that corresponds to the new camera angle. The homography may be obtained as follows:

$$H = \begin{bmatrix} h_{00} & h_{01} & h_{02} \\ h_{10} & h_{11} & h_{12} \\ h_{20} & h_{21} & h_{22} \end{bmatrix}$$

Let (X1, Y1) be the coordinates of a geometric feature of the deterministic object 804 in the first image 802-1 and (X'1, Y'1) be the coordinates of the same geometric feature of the same deterministic object 804 in the second image 802-2, etc. Then, the homograph (H) may relate them in the following way:

$$\begin{bmatrix} X1 \\ Y1 \\ 1 \end{bmatrix} = H \begin{bmatrix} X'1 \\ Y'1 \\ 1 \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} X'1 \\ Y'1 \\ 1 \end{bmatrix}$$

Various approaches to finding the homography may be applied. For example, the OpenCV function findHomography may be used by providing two sets of corresponding coordinates in both images to obtain the homography.

Once the homography between the first image 802-1 and the second image 802-2 has been identified, then that homography may be applied to the saved user-free background image of the first image 802-1 as is illustrated in FIG. 8B. For example, the homography may be applied to all to transform the first image 802-1 to a warped image 802-3 that serves as a new user-free background image for background removal and/or foreground retrieval that better corresponds to the new camera angle.

FIGS. 9A-9D illustrate examples of a deployment 900 of an architecture (e.g., architecture 500 in FIG. 5) for deterministic object alignment for background removal, according to various embodiments. Specifically, deployment 900 illustrates an example of an automated alignment and cropping feature, such as is described above with respect to the execution of alignment manager 504 and cropping manager 506 of FIG. 5.

In FIG. 9A, deployment 900 includes a warped user-free background image 902-1 (e.g., such as the warped image 802-3 from FIG. 8B) of a physical environment for a video conference and a subsequently captured image 902-2 (e.g., such as the second image 802-2 of FIG. 8A) of the physical environment for the video conference. Both images may include the deterministic object 904.

An alignment operation 906 may be performed to align the warped user-free background image 902-1 with the subsequently captured image 902-2. This alignment operation 906 may be performed by aligning (e.g., overlapping) the geometric features of the deterministic object 904 in the warped user-free background image 902-1 with the same geometric features of the same deterministic object 904 in the subsequently captured image 902-2.

As a result of alignment operation 906, the warped user-free background image 902-1 and the subsequently captured image 902-2 may be aligned as is illustrated in FIG. 9B. This alignment may result in some overlapping areas between the two images and some non-overlapping areas between the two images. The non-overlapping portions of the aligned warped user-free background image 902-1 may then be cropped to produce a cropped user-free background image 902-3 as illustrated in FIG. 9C.

The cropped user-free background image 902-3 may then be used as the reference image for background removal and/or foreground retrieval operations in subsequent images of an ongoing video stream. For example, the cropped user-free background image 902-3 may be used as a reference image to remove the background and/or retrieve the foreground from subsequently captured image 902-2, thereby generating background removed image 902-4 from subsequently captured image 902-2.

Removed background image 902-4 may be an image that has removed the background components of the source image and only includes foreground components. Removed background image 902-4 may then be supplied as part of a video conferencing session video stream which, in various embodiments, may be configured for display as a hologram or other XR format.

Figure 10:
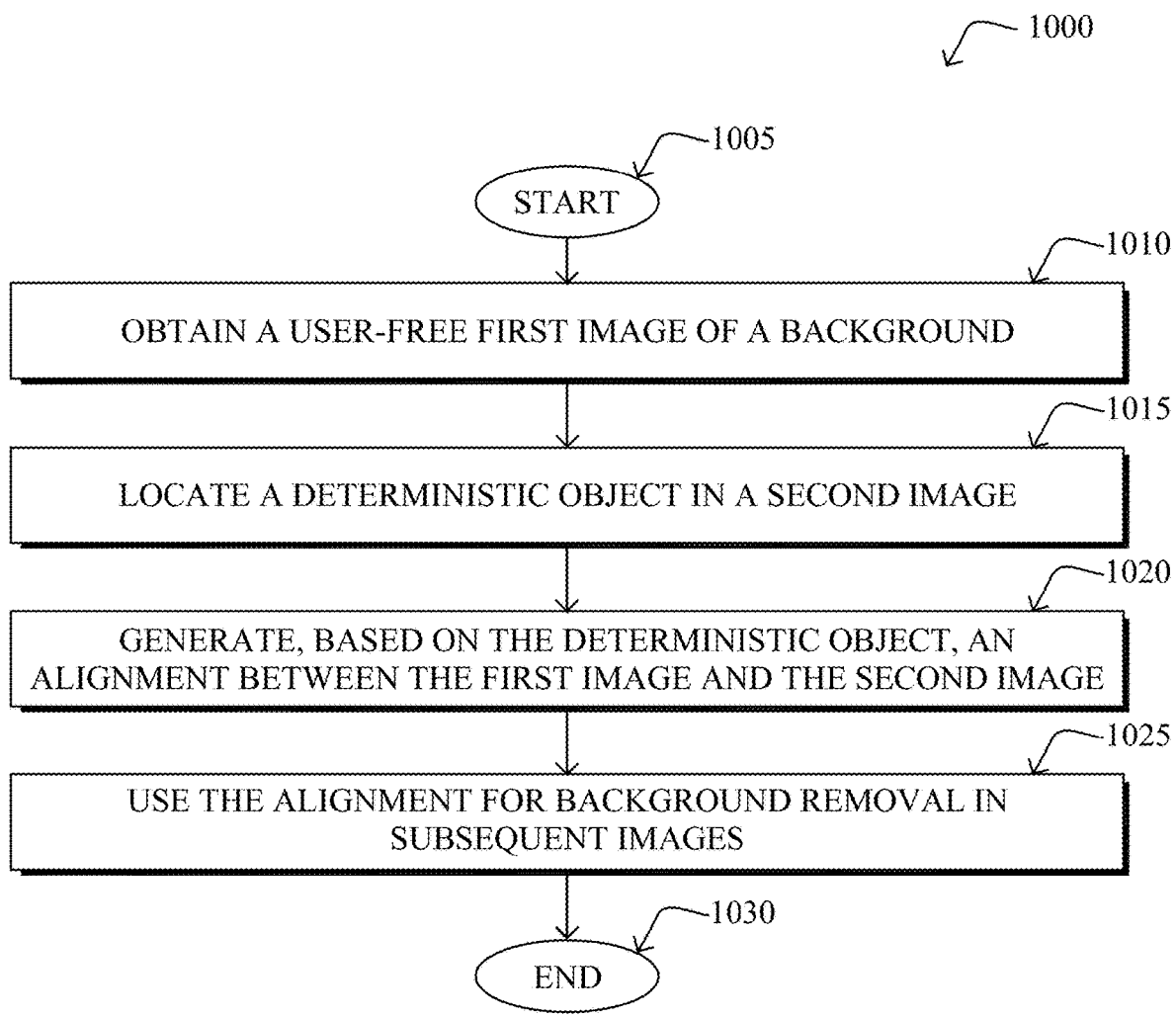
FIG. 10 illustrates an example of a simplified procedure for deterministic object alignment for background removal, in accordance with one or more embodiments described herein.

FIG. 10 illustrates an example simplified procedure (e.g., method) for deterministic object alignment for background removal, in accordance with one or more embodiments described herein. For example, a non-generic, specifically configured device (e.g., device 200) may perform procedure 1000 by executing stored instructions (e.g., process 248).

The procedure 1000 may start at step 1005, and continue to step 1010, where, as described in greater detail above, a device may obtain a user-free first image of a background portion of a physical environment. The first image may include a deterministic object. The user-free first image may be captured responsive to detecting a previously detected user has vacated the physical environment.

At step 1015, as detailed above, a device may locate the deterministic object in a second image of the physical environment. The deterministic object may include one or more geometric features.

At step 1020, as detailed above, a device may generate, based on the deterministic object, an alignment between the user-free first image and the second image. Prior to generating the alignment, the device may determine, based on a positional shift of the deterministic object between the user-free first image and the second image, whether the user-free first image is valid for generating the alignment. The positional shift may be determined based on a difference between coordinates of the geometric features of the deterministic object between the first image and the second image. The device may issue a request for an updated user-free image of the background portion of the physical environment responsive to a detecting a positional shift of the deterministic object between the user-free first image and the second image that exceeds a threshold.

The device may warp the user-free first image into a warped image that corresponds to an adjustment of an angle of an image capture device between capturing the user-free first image and the second image. The device may then use the warped image to generate the alignment. The device may crop a non-overlapping area between the warped image and the second image in the alignment.

In various embodiments, the device may perform a homography-based image alignment based on a position of portions of the deterministic object in the user-free first image and a position of the portions of the deterministic object in the second image.

At step 1025, as detailed above, a device may use the alignment for background removal in subsequent images of the physical environment. For example, the device may use the alignment to extract a user and an object as foreground for display in the subsequent images. The subsequent images may include images in an ongoing video stream configured for holographic presentation.

Additionally, the device may obtain an updated user-free image of the background portion of the physical environment. The updated user-free image of the background portion of the physical environment may be obtained responsive to detecting a presence of a user in the physical environment subsequent to capturing the user-free first image and detecting that the user has vacated the physical environment.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce enhanced mechanisms for automated user-free background image capture and/or automated image alignment for background removal. The techniques may provide improved video conferencing performance and user experience by automatically adapting background removal reference background images to changes in video conferencing camera angles and/or by automatically recognizing when a background image being used as a reference for background removal is no longer acceptable and should be updated. As such, the deterministic object alignment and background removal techniques described herein may improve communications across a computing network.

While there have been shown and described illustrative embodiments that provide for deterministic object alignment for background removal, it is to be understood that various other adaptations and modifications may be made within the spirit and scope of the embodiments herein. For example, while certain embodiments are described herein with respect to using certain models for purposes of deterministic object detection, the techniques are not so limited and other deterministic object detection techniques may be used in other embodiments.

In one embodiment, a method may include obtaining, by a device, a user-free first image of a background portion of a physical environment including a deterministic object; locating, by the device, the deterministic object in a second image of the physical environment; generating, by the device and based on the deterministic object, an alignment between the user-free first image and the second image; and using, by the device, the alignment for background removal in subsequent images of the physical environment. In one embodiment, the user-free first image is captured responsive to detecting, by the device, a previously detected user has vacated the physical environment. In one embodiment, the method may further comprise determining, by the device and based on a positional shift of the deterministic object between the user-free first image and the second image, whether the user-free first image is valid for generating the alignment. In one embodiment, generating the alignment further comprises: warping, by the device, the user-free first image into a warped image that corresponds to an adjustment of an angle of an image capture device between capturing the user-free first image and the second image; and generating the alignment using the warped image. In one embodiment, generating the alignment further comprises: cropping, by the device, a non-overlapping area between the warped image and the second image in the alignment. In one embodiment, generating the alignment further comprises: performing, by the device, homography-based image alignment based a position of portions of the deterministic object in the user-free first image and a position of the portions of the deterministic object in the second image. In one embodiment, the method further comprises: obtaining, by the device, an updated user-free image of the background portion of the physical environment responsive to detecting a presence of a user in the physical environment subsequent to capturing the user-free first image and detecting that the user has vacated the physical environment. In one embodiment, using the alignment for background removal in subsequent images of the physical environment includes extracting a user and an object as foreground for display in the subsequent images. In one embodiment, the subsequent images are images in an ongoing video stream configured for holographic presentation. In one embodiment, the method further comprises: issuing, by the device, a request for an updated user-free image of the background portion of the physical environment responsive to a detecting a positional shift of the deterministic object between the user-free first image and the second image that exceeds a threshold.

In one embodiment, an apparatus comprises: one or more network interfaces to communicate with a network; a processor coupled to the one or more network interfaces and configured to execute one or more processes; and a memory configured to store a process that is executable by the processor, the process, when executed, configured to: obtain a user-free first image of a background portion of a physical environment including a deterministic object; locate the deterministic object in a second image of the physical environment; generate, based on the deterministic object, an alignment between the user-free first image and the second image; and use the alignment for background removal in subsequent images of the physical environment. In one embodiment, the user-free first image is captured responsive to detecting a previously detected user has vacated the physical environment. In one embodiment, the process is further configured to determine, based on a positional shift of the deterministic object between the user-free first image and the second image, whether the user-free first image is valid for generating the alignment. In one embodiment, the process is further configured to warp the user-free first image into a warped image that corresponds to an adjustment of an angle of an image capture device between capturing the user-free first image and the second image; and generate the alignment using the warped image. In one embodiment, the process is further configured to crop a non-overlapping area between the warped image and the second image. In one embodiment, the process is further configured to perform homography-based image alignment using a position of portions of the deterministic object in the user-free first image and a position of the portions of the deterministic object in the second image to generate the alignment. In one embodiment, the process is further configured to obtain an updated user-free image of the background portion of the physical environment responsive to detecting a presence of a user in the physical environment subsequent to capturing the user-free first image and detecting that the user has vacated the physical environment. In one embodiment, the process is further configured to use the alignment for background removal in subsequent images of the physical environment to extract a user and an object as foreground for display in the subsequent images. In one embodiment, the subsequent images are images in an ongoing video stream configured for holographic presentation.

In one embodiment, a tangible, non-transitory, computer-readable medium having computer-executable instructions stored thereon that, when executed by a processor on a computer, may cause the computer to perform a method comprising: obtaining, by a process, a user-free first image of a background portion of a physical environment including a deterministic object; locating, by the process, the deterministic object in a second image of the physical environment; generating, by the process and based on the deterministic object, an alignment between the user-free first image and the second image; and using, by the process, the alignment for background removal in subsequent images of the physical environment.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   obtaining, by a device, a user-free first image of a background portion of a physical environment including a deterministic object;
   locating, by the device, the deterministic object in a second image of the physical environment;
   generating, by the device and based on the deterministic object, an alignment between the user-free first image and the second image; and
   using, by the device, the alignment for background removal in subsequent images of the physical environment.

2. The method as in claim 1, wherein the user-free first image is captured responsive to detecting, by the device, a previously detected user has vacated the physical environment.

3. The method as in claim 1, further comprising:
   determining, by the device and based on a positional shift of the deterministic object between the user-free first image and the second image, whether the user-free first image is valid for generating the alignment.

4. The method as in claim 1, wherein generating the alignment further comprises:
   warping, by the device, the user-free first image into a warped image that corresponds to an adjustment of an angle of an image capture device between capturing the user-free first image and the second image; and
   generating the alignment using the warped image.

5. The method as in claim 4, wherein generating the alignment further comprises:
   cropping, by the device, a non-overlapping area between the warped image and the second image in the alignment.

6. The method as in claim 1, wherein generating the alignment further comprises:
   performing, by the device, homography-based image alignment based a position of portions of the deterministic object in the user-free first image and a position of the portions of the deterministic object in the second image.

7. The method of claim 1, further comprising:
   obtaining, by the device, an updated user-free image of the background portion of the physical environment responsive to detecting a presence of a user in the physical environment subsequent to capturing the user-free first image and detecting that the user has vacated the physical environment.

8. The method of claim 1, wherein using the alignment for background removal in subsequent images of the physical environment includes extracting a user and an object as foreground for display in the subsequent images.

9. The method of claim 1, wherein the subsequent images are images in an ongoing video stream configured for holographic presentation.

10. The method of claim 1, further comprising:
    issuing, by the device, a request for an updated user-free image of the background portion of the physical environment responsive to a detecting a positional shift of the deterministic object between the user-free first image and the second image that exceeds a threshold.

11. An apparatus, comprising:
    one or more network interfaces to communicate with a network;
    a processor coupled to the one or more network interfaces and configured to execute one or more processes; and
    a memory configured to store a process that is executable by the processor, the process, when executed, configured to:
    obtain a user-free first image of a background portion of a physical environment including a deterministic object;
    locate the deterministic object in a second image of the physical environment;
    generate, based on the deterministic object, an alignment between the user-free first image and the second image; and use the alignment for background removal in subsequent images of the physical environment.

12. The apparatus as in claim 11, wherein the user-free first image is captured responsive to detecting a previously detected user has vacated the physical environment.

13. The apparatus as in claim 11, the process further configured to:
    determine, based on a positional shift of the deterministic object between the user-free first image and the second image, whether the user-free first image is valid for generating the alignment.

14. The apparatus as in claim 11, the process further configured to:
    warp the user-free first image into a warped image that corresponds to an adjustment of an angle of an image capture device between capturing the user-free first image and the second image; and
    generate the alignment using the warped image.

15. The apparatus as in claim 14, the process further configured to:
    crop a non-overlapping area between the warped image and the second image.

16. The apparatus as in claim 11, the process further configured to:
    perform homography-based image alignment using a position of portions of the deterministic object in the user-free first image and a position of the portions of the deterministic object in the second image to generate the alignment.

17. The apparatus of claim 11, the process further configured to:
    obtain an updated user-free image of the background portion of the physical environment responsive to detecting a presence of a user in the physical environment subsequent to capturing the user-free first image and detecting that the user has vacated the physical environment.

18. The apparatus of claim 11, the process further configured to:
    use the alignment for background removal in subsequent images of the physical environment to extract a user and an object as foreground for display in the subsequent images.

19. The apparatus of claim 11, wherein the subsequent images are images in an ongoing video stream configured for holographic presentation.

20. A tangible, non-transitory, computer-readable medium having computer-executable instructions stored thereon that, when executed by a processor on a computer, cause the computer to perform a method comprising:
    obtaining a user-free first image of a background portion of a physical environment including a deterministic object;
    locating the deterministic object in a second image of the physical environment;
    generating, based on the deterministic object, an alignment between the user-free first image and the second image; and
    using the alignment for background removal in subsequent images of the physical environment.

* * * * *